Dec. 4, 1928.　　　　　　　　　　　　　　　　　1,693,891
V. J. DUNKER
PHOTOGRAPHIC PRINTER
Filed May 8, 1926　　　4 Sheets-Sheet 1
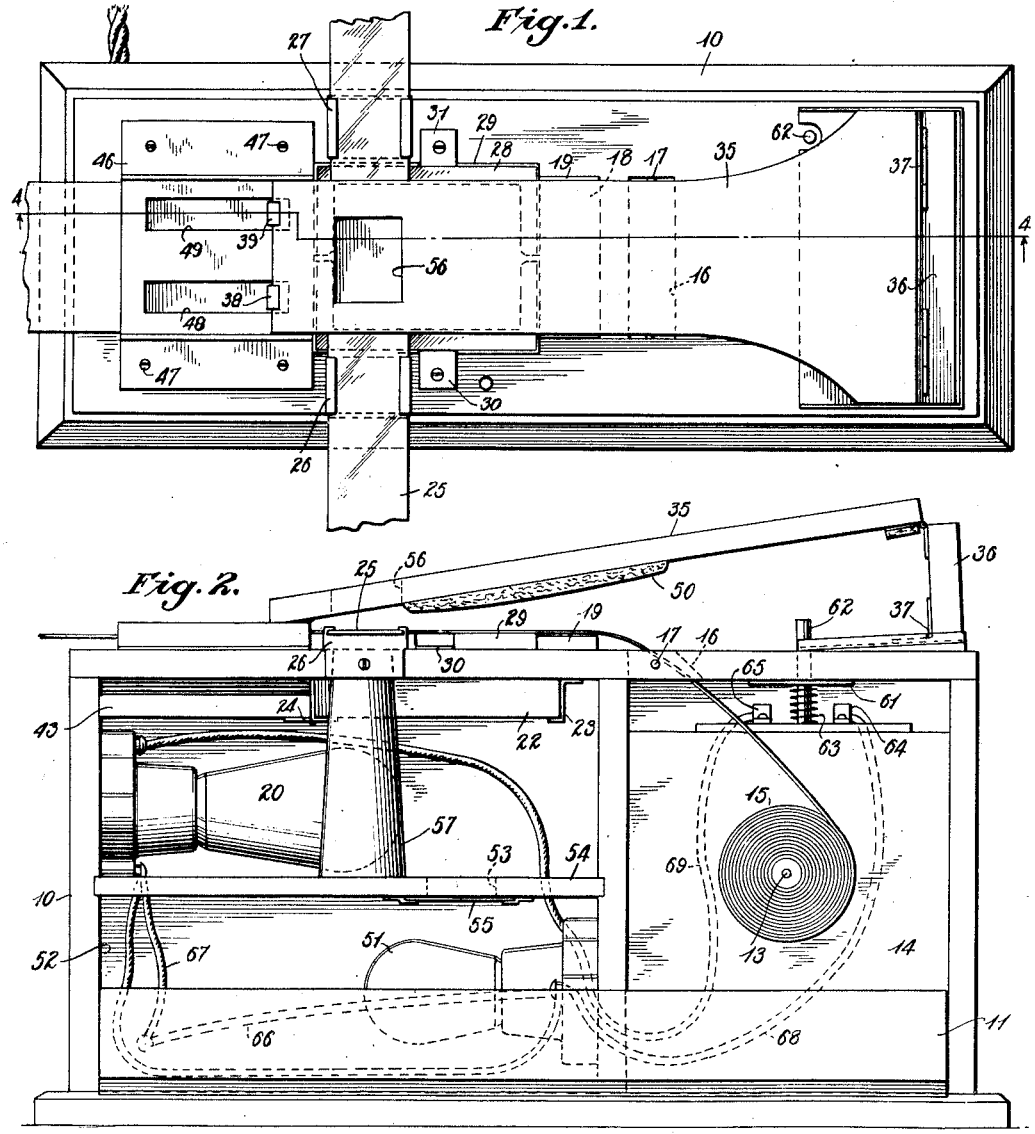
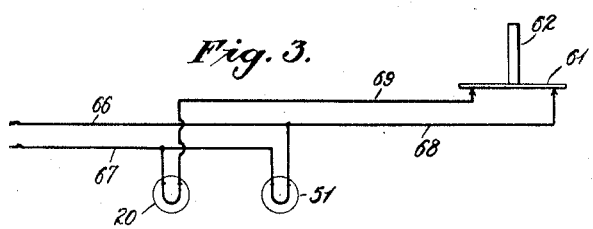
Inventor
V. J. Dunker
By Brown & Phelps
Attorneys Dec. 4, 1928.

V. J. DUNKER 1,693,891

PHOTOGRAPHIC PRINTER

Filed May 8, 1926 4 Sheets-Sheet 2

Inventor
V. J. Dunker
By Brower & Phelps
Attorneys

Dec. 4, 1928.
V. J. DUNKER
1,693,891
PHOTOGRAPHIC PRINTER
Filed May 8, 1926
4 Sheets-Sheet 3
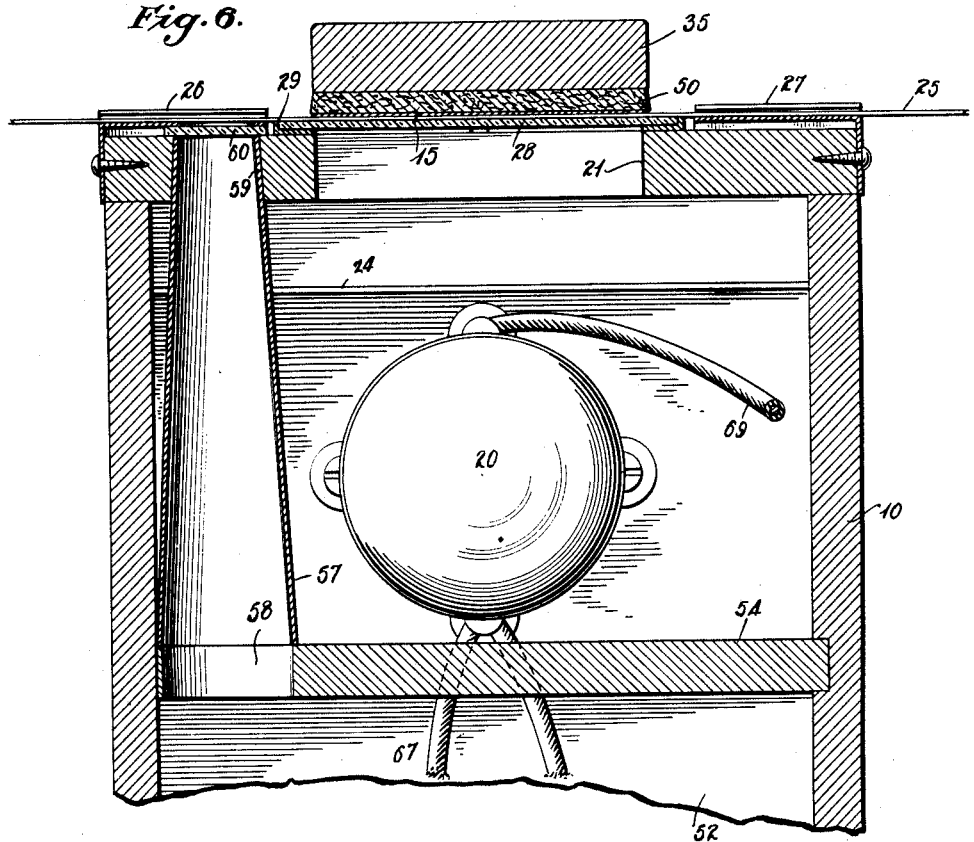
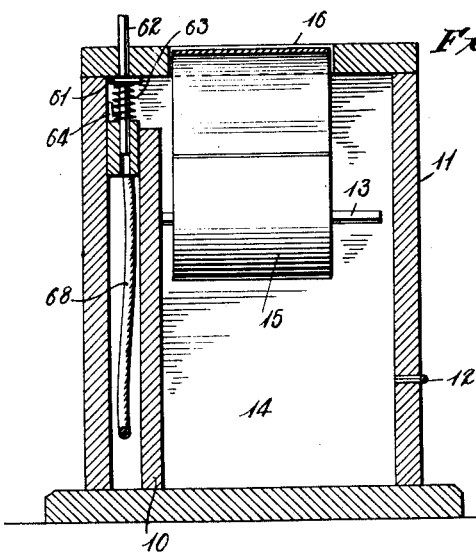
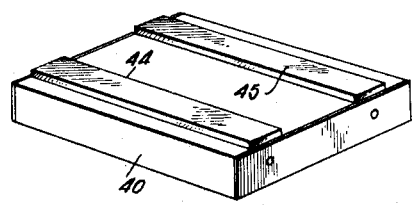
Inventor
V. J. Dunker Dec. 4, 1928.
V. J. DUNKER
1,693,891
PHOTOGRAPHIC PRINTER
Filed May 8, 1926 4 Sheets-Sheet 4
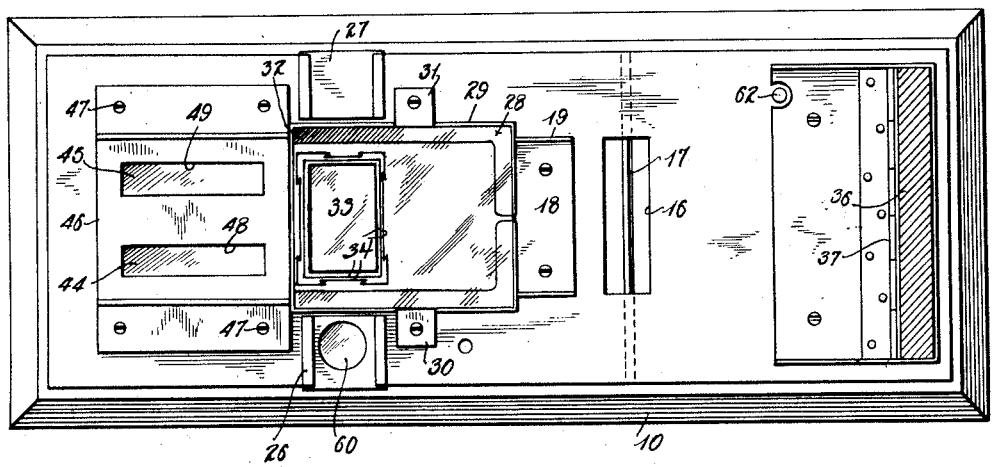
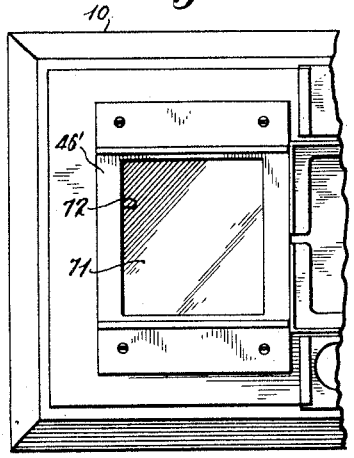
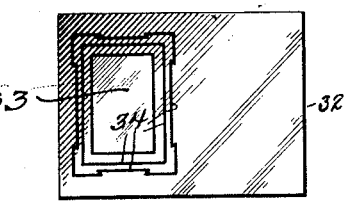
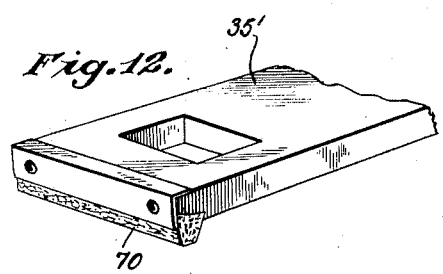
Inventor
V. J. Dunker
By Brown & Phelps
Attorneys Patented Dec. 4, 1928.

1,693,891

UNITED STATES PATENT OFFICE.

VINCENT J. DUNKER, OF STE. GENEVIEVE, MISSOURI.

PHOTOGRAPHIC PRINTER.

Application filed May 8, 1926. Serial No. 107,617.

The invention relates to photographic printing devices and has as an object the provision of a device permitting the rapid production of photographic prints.

It is a further object of the invention to provide means to feed the paper, to press the paper against a negative, and to close an electric circuit to provide printing light with a single motion of the hand of the operator.

It is a further object of the invention to provide a printer having a source of white light to shine through the negative succeeding the one being printed in order to allow the operator to judge of the time of exposure necessary for the negatives in advance of the printing thereof.

It is a further object of the invention to provide a source of red light to enable the negative and mask to be brought into correct registry.

It is a further object of the invention to provide means for printing a mask either about the space which the next print is to occupy, while making an exposure through one negative, or a portion of such margin, or to print the margin and negative coincidentally, as desired.

Further objects of the invention will appear from the following description when read in connection with the accompanying drawings wherein:

Figure 1 is a plan view;

Figure 2 is a side elevation with the closure giving access to the interior of the device opened;

Figure 3 is a diagram of circuits;

Figure 4:
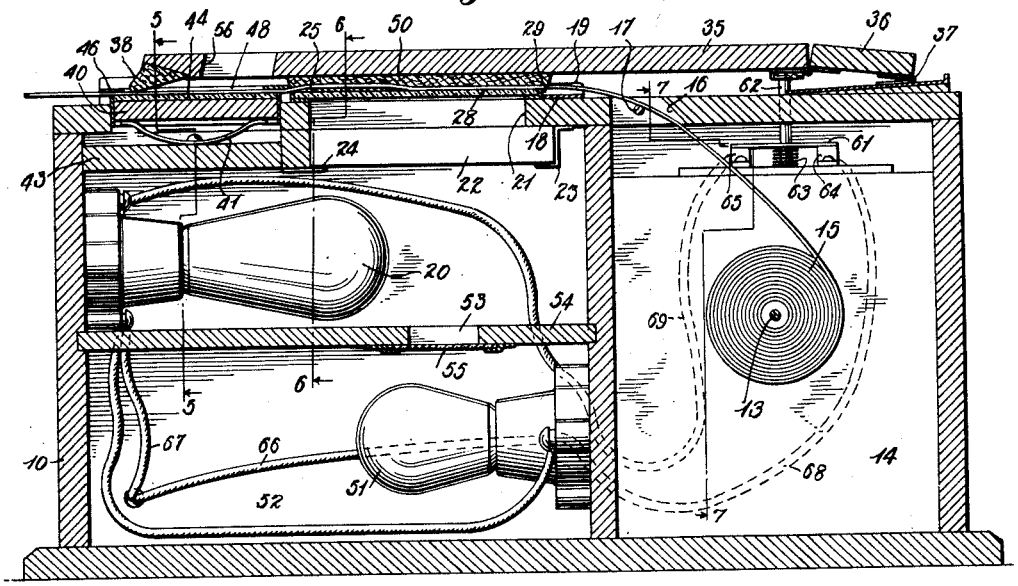
Figure 4 is a vertical section on line 4—4 of Figure 1.
Figure 5:
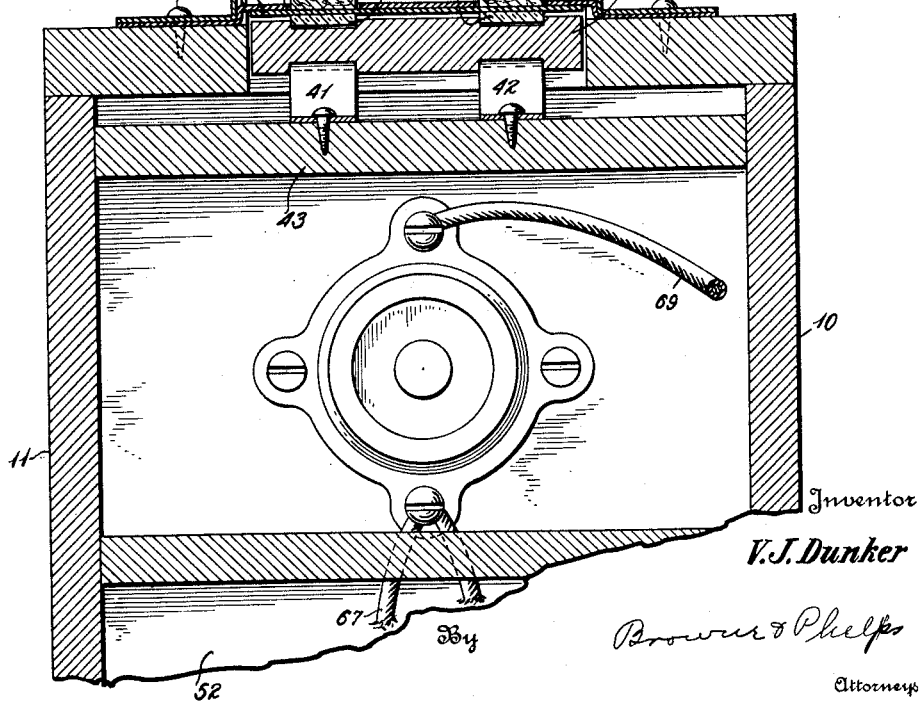

Figures 5, 6, and 7, are detail sections upon an enlarged scale taken upon the corresponding lines of Figure 4;

Figure 8 is a perspective view of a paper slide;

Figure 9 is a plan view of the top of the device with a portion of the paper feeder in section and the remaining portion removed;

Figure 10 is a detail plan view of a modified form;

Fig. 11 is a plan view of the mask for printing the view and border simultaneously;

Figure 12 is a detail perspective view of a modified form of feed device.

As shown, the device comprises a casing 10 having a closure 11 hinged, as indicated at 12 in Figure 7, to give access to the interior of the device. To provide a supply of sensitive paper for the making of prints, there is shown a spindle 13 in a compartment 14 upon which the roll 15 of sensitive paper may be mounted, the paper passing from the compartment through an opening 16 over a roller or pin 17. To guide the paper in its travel, there is shown a strap 18 having flanges 19 upon its edges spaced apart in accordance with the width of paper to be utilized.

To provide light for exposure of paper, an incandescent lamp is shown at 20, the light of which is adapted to pass through an opening 21 in the top of the casing, a ground glass 22 being preferably supplied to diffuse the light and provide even exposure. The ground glass is shown as supported in clips 23, 24.

The negative to be printed, which in devices of this character is usually contained in a strip of film as 25, is shown as guided by the clips 26, 27, having their sides spaced apart in accordance with the size of the negative in work. To support the negative while being printed and to carry the masking ornamentation, there is shown a plate preferably of glass 28, supported in a frame 29, shown as provided with upturned edges of a depth equal to the thickness of the glass and as provided with ears 30, 31, to secure the frame to the top of the printer.

To feed the paper, there is shown a bar 35 hinged to a member 36 which in turn is hinged at 37 to the top of the printer. Friction means to cause the paper to slide when pressure is placed upon the bar 35 is shown in the form of pads 38, 39, preferably of soft rubber. To coact with the pads 38, 39, there is shown a block 40 yieldingly supported upon springs 41, 42, which in turn are shown as supported by a member 43 rigidly secured within the printer. The block 40 is preferably supplied with smooth members as of glass at 44, 45, lying upon the opposite side of the paper from the pads 38, 39. Normally the springs 41, 42, press the paper upward against the sheet 46 which is secured by means of screws 47 to the top of the printer and which sheet has slots 48, 49, to give the pads 38, 39, access to the sensitized surface of the paper. The friction upon the block 40, or the strips 44, 45, comes upon the back of the paper and therefore does not produce friction marks upon the finished print.

To provide pressure of the paper against the negative while the exposure is being made, a pad 50 is supplied upon the lower surface of the bar 35. A continuously lighted bulb 51 is shown in a lower light compartment 52 for purposes of observation to provide red light to enable the negative to be adjusted to the printing transparent space 33. An opening 53 is shown in the partition 54 and a ruby element 55 is supplied over the opening through which ruby light may shine, enabling the negative to be observed through the transparent space 33 and through the paper, an opening 56 being provided in the bar 35 for purposes of observation. To provide a supply of white light to permit the operator to judge the negative next to be printed while any printing operation is in progress, tube 57 is shown registering with an opening 58 in the partition 54 and allowing the light to shine through the upper portion of the printer by means of line 59, a glass, preferably a ground glass, 60 being provided over the mouth of the tube.

To light the bulb 20 after the feed of the paper and at the end of the stroke of bar 35, a switch bridging member 61 is shown carried by a pin 62, normally spring pressed to open position by means of a spring 63. The circuit is shown as adapted to be completed by contacts 64, 65, with which the bridging member 61 is brought into contact when the pin 62 is depressed by means of lowering of bar 35, the circuit being held closed as long as pressure is preserved upon the bar 35. By the diagram of circuits of Figure 3, it will be seen that lamp 51 is continuously inserted between supply wires 66, 67, and that connection between wires 66 and lamp 20 is had through wires 68, 69, under control of switch 61.

A modified form of feed device is shown in Figures 10 and 12, wherein the end of bar 35' is shown provided with a single pad 70 preferably of soft rubber and a glass plate 71 is exposed through a large opening 72 in the sheet 46', the operation being exactly the same as that already described.

By use of the form of mask illustrated, and shown in Fig. 11 separated from the printer, the print may be made and margin lines may be exposed thereabout at a single operation. As there shown the mark is formed with a transparent portion 33 and transparent or translucent lines 34 forming an ornamental border about the transparent portion, the remainder of the mask being opaque.

Minor changes may be made in the physical embodiment of the invention without departing from its spirit.

I claim:

1. A photographic printer comprising, in combination, means to guide a strip of negatives, an intermittently illuminated source of white light below said guiding means, a continuously operating white light in a separate compartment below said guiding means, means to supply ruby light from the continuously illuminated source to permit of adjustment of a desired negative and means to convey white light from said continuously acting source to permit of inspection of the succeeding negative on the strip.

2. A photographic printer comprising, in combination, means to support and guide a strip of photographic negatives, means to house a supply of sensitive paper, means to feed said paper over said negative comprising a reciprocating member having frictional engagement with the paper and a limit of travel to correspond to the size of the negative, means carried by said reciprocating member to press the paper into contact with the negative at the end of the travel of the member, a source of light for exposure of paper and means governed by pressure upon the reciprocating member at the completion of its travel to bring said light into operation and to put said light out of operation when the pressure upon said member is removed.

3. A photographic printer comprising, in combination, means to support a strip of negatives, means to enclose a supply of sensitive paper, means to feed said sensitive paper across said negative holding means comprising a bar pivotally connected to a member pivotally mounted upon the printer, whereby pressure on the bar will cause movement of reciprocation and of translation toward the printer, frictional means carried by the free end of said bar to engage the paper and cause longitudinal movement thereof, a source of light for exposure of the paper, means operable by said member at the end of its motion of translation to cause exposure of the paper by means of said source of light.

4. A photographic printer comprising, in combination, means to support a strip of negatives, means to enclose a supply of sensitive paper, means to feed said sensitive paper across said negative holding means comprising a bar pivotally connected to a member pivotally mounted upon the printer, whereby pressure on the bar will cause movement of reciprocation and of translation toward the printer, frictional means carried by the free end of said bar to engage the paper and cause longitudinal movement thereof, a source of light for exposure of the paper, means operable by said member at the end of its motion of translation to cause exposure of the paper by means of said source of light and acting upon return to normal of said member to terminate said exposure.

5. A photographic printer comprising, in combination, means to support and guide a strip of negatives, means to house a supply of sensitive paper, means to guide said sensitive paper across said supporting means, means to cover and confine the paper after passage across the supporting means, yielding means pressing the paper against the confining means, frictional feeding means to simultaneously compress said yielding means and to move the paper across said supporting means a predetermined distance, a source of exposing light and means under control of said feeding means to expose the paper through the negative during downward pressure upon said feeding means only.

VINCENT J. DUNKER.